United States Patent Office 3,320,281
Patented May 16, 1967

3,320,281
METHOD OF PREPARING 3-INDOLYLACETIC ACID
Lev Beniaminovich Shagalov and Nickolai Nickolaevich Suvorov, Moscow, U.S.S.R., assignors to Vsesojuzny Nauchno-Issledovatelsky Khimiko-Farmatsevtichesky Institute, Moscow, U.S.S.R.
No Drawing. Filed Jan. 6, 1965, Ser. No. 423,812
5 Claims. (Cl. 260—326.13)

The present invention relates to a method of manufacturing 3-indolylacetic acid (heteroauxine), which finds application as a plant growth hormone.

Known in the art are the methods of synthesizing 3-indolylacetic acid from compounds containing the indole ring. For example, the products obtained by interacting 3-indolyl magnesium halide with chloroacetonitrile, N,N-diethylchloroacetamide or ethylene oxide can be converted into the heteroauxine by hydrolysis or oxidation. 3-indolylacetic acid can likewise be produced by the reaction of hydrocyanic acid or salts thereof with indole in the presence of formalin, followed by the hydrolysis of the nitrile obtained.

The prior art procedures have inherent disadvantages of utilizing toxic substances, such as hydrocyanic acid or cyanides and requiring an additional stage of purification of the final product. It is an object of the present invention to provide a method whereby the desired product may be obtained without additional purification from cheap and readily available starting materials.

This object is accomplished by using indole and inexpensive chloroacetic acid as the starting materials for the synthesis of 3-indolylacetic acid.

The process of the present invention is carried out by reacting indole, chloroacetic acid and an aqueous alkaline solution in an autoclave. The reaction mixture is heated to 250–290° C., preferably to 285–290° C., maintained for several hours under a pressure of 50 to 90 atm., cooled and filtered. The filtrate is acidified, and the crystals that precipitate are pressed, washed with ice water and dried.

For a better understanding of the present invention by those skilled in the art, the following example is given by way of illustration.

*Example*

Into a 0.5 lit. pressure vessel were charged 5.85 g. (0.05 mole) of indole, 14 g. (0.15 mole) of chloroacetic acid and 150 ml. of 17% aqueous solution of potassium hydroxide. The reactor was next charged with nitrogen to a pressure of 5 atm. and the reaction mixture was heated to 285–290° C. and maintained at this temperature for 15 hours, the pressure in the reactor being 85 to 90 atm. Then the reaction mixture was cooled, discharged from the pressure vessel and filtered. The filtrate, with external cooling, was acidified with concentrated hydrochloric acid, until it showed an acid reaction to Congo red, and maintained for 2–3 hours at a temperature of 8–10° C. The precipitated crystals of 3-indolylacetic acid were filtered off, washed on the filter with ice water until the washing water was acid-free, and dried. The product consisted of 4.52 g. of a white crystalline compound (melting point, 159–162° C.). The yield was 51% of the theoretical (on the basis of indole used).

The invention has been described with particular reference to the preferred embodiment thereof, but it will be readily understood by those skilled in the art that variations and modifications can be effected within the spirit and scope of the invention as described hereinabove and as defined in the appended claims.

We claim:
1. A method for the manufacture of 3-indolylacetic acid which comprises reacting chloroacetic acid with indole in the presence of an alkali at a pressure of 50 to 90 atm. and a temperature of 250 to 290° C.
2. A method as claimed in claim 1 wherein the reaction is carried out in the 285 to 290° C. temperature range.
3. A method as claimed in claim 1 wherein potassium hydroxide is used as the alkali.
4. A method as claimed in claim 1 wherein 3-indolylacetic acid is separated from the reaction mixture by filtration and thereafter it is precipitated from the filtrate by adding hydrochloric acid.
5. A method as claimed in claim 1 wherein the reaction is carried out in an autoclave in a nitrogen atmosphere.

References Cited by the Examiner
UNITED STATES PATENTS
2,701,251   2/1955   Fox et al. _____ 260—326.13

ALEX MAZEL, *Primary Examiner.*

M. U. O'BRIEN, J. A. NARCAVAGE,
*Assistant Examiners.*